Aug. 16, 1932.                G. CALVIGNAC                1,872,116
                                BRAKE DRUM
                         Original Filed Sept. 1, 1928
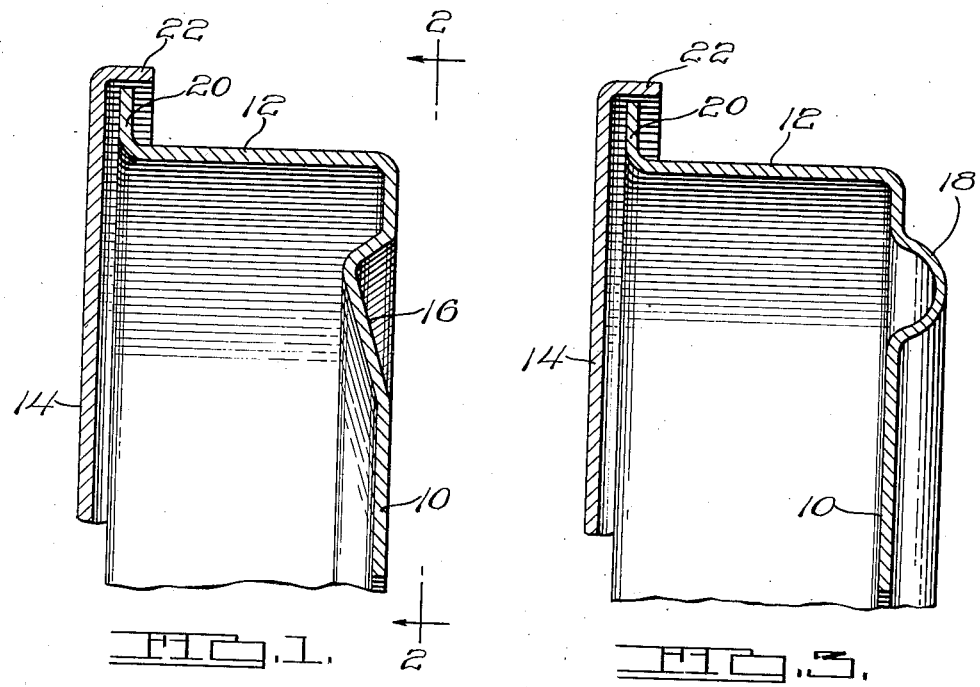
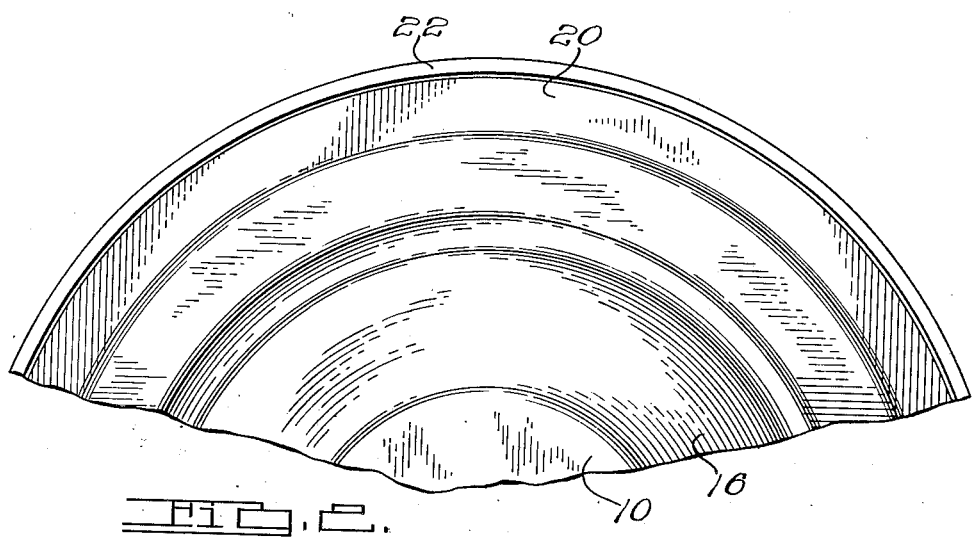
INVENTOR.
Germain Calvignac
BY
ATTORNEYS.

Patented Aug. 16, 1932

1,872,116

UNITED STATES PATENT OFFICE

GERMAIN CALVIGNAC, OF MANNHEIM, GERMANY, ASSIGNOR, BY MESNE ASSIGNMENTS, TO BENDIX AVIATION CORPORATION, OF NEW YORK, N. Y., A CORPORATION OF DELAWARE

BRAKE DRUM

Application filed September 1, 1928, Serial No. 303,550. Renewed February 5, 1932.

This invention relates to brakes, and is illustrated as embodied in a novel type of brake drum for an internal expanding automobile brake.

Ordinarily brake drums are cup-shaped, having heads with cylindrical braking flanges attached thereto at their edges, and are often pressed in dies from sheet steel or the like. Especially in the case of the pressed type of drum, the braking flange can be distorted more or less, for example by the outward pressure of the brake shoes. Since one edge of the flange is held by the head of the drum against expansion, while the free edge of the flange is relatively free to expand, the free edge expands more than the opposite edge, under such distorting pressures, giving what is known as a "bell-mouth" effect. This effect is very objectionable, more particularly since with a "bell-mouth" drum it is impossible for the brake shoes to bear evenly crosswise of the braking flange.

The present invention has to do with eliminating this effect, by so arranging the parts that the opposite sides of the braking flange expand equally in case of distortion due to internal pressures, or otherwise caused. Preferably the drum is formed with means, such as an annular groove adjacent the braking flange, permitting a stretching or expanding of the integrally-connected edge of the braking flange, so that this edge will expand as readily as the free edge. In order to limit the necessary stretching at the head of the drum, I prefer also to reinforce the free edge of the drum, for example by a radial flange, to diminish its expansion.

The above and objects and features of the invention, including various novel and desirable details of construction, will be apparent from the following description of the illustrative embodiments shown in the accompanying drawing, in which:

Figure 1 is a radial section through one side of my novel brake drum;

Figure 2 is an elevation of the portion of the drum shown in Figure 1 looking in the direction of the arrows 2—2 of Figure 1; and Figure 3 is a partial section, corresponding to Figure 1, but showing a different modification.

Each drum includes a head 10 and a cylindrical braking flange 12, the illustrated drums being pressed from sheet steel as cup-shaped stampings. At the open side of the drum there is usually arranged a brake backing plate 14.

As explained above, there is a tendency in a drum of this type to expand or stretch more easily at the free (left) edge of the flange 12 than at the opposite (right) edge where it is normally held by the head of the drum. According to my invention, this uneven stretching action is prevented by forming the head 10 to permit sufficient radial expansion or stretching so that flange 12 will maintain its cylindrical form as it expands.

Preferably this is done by forming the head 10 with a curved section annular groove 16 (Figs. 1 and 2) or 18 (Fig. 3) adjacent the flange 12. Groove 16 extends into the interior of the drum, leaving the head flat to be mounted against an artillery wheel, while groove 18 extends outwardly, this being permissible for use with a disk wheel and giving more clearance inside the drum.

While many of the advantages of my invention can be obtained merely by permitting the head to stretch slightly radially, I consider it highly advantageous, especially as permitting the use of a lighter gage steel for a drum of given strength, to secure only part of the even expansion by facilitating the expansion of the head, but to maintain the even expansion nevertheless by providing means at the free (left) edge of the flange resisting expansion of the flange. In the illustrated drums this is accomplished by providing radial reinforcing and stiffening flanges 20. In order to form as close a joint as possible, backing plates 14 may be formed with peripheral flanges 22 encircling the reinforcing flanges 20.

Thus by reinforcing the free edge of the drum to resist expansion, and forming the head of the drum to facilitate expansion, the flange 12 may be arranged to expand or distort uniformly entirely across its width, so that the brake shoes will bear there-against for their entire widths at all times.

While two illustrative embodiments have been described in detail, it is not my intention to limit the scope of the invention to those particular embodiments, or otherwise than by the terms of the appended claims.

I claim:

1. A brake drum having a head and a substantially cylindrical braking flange reinforced at its free edge to resist expansion of the flange adjacent said edge, the head being formed with a curved corrugation to permit limited expansion of the flange adjacent its opposite edge.

2. A brake drum having a head and a substantially cylindrical braking flange reinforced at its free edge to resist expansion of the flange adjacent said edge, the head being formed with an annular groove of curved cross section to permit limited expansion of the flange adjacent its opposite edge.

3. A brake drum having a head and a substantially cylindrical braking flange reinforced at its free edge by a radially-extending stiffening flange to resist expansion of the flange adjacent said edge, the head being formed with an annular groove having a curved radial cross section to permit limited expansion of the flange adjacent its opposite edge.

4. A brake drum having a head and a substantially cylindrical braking flange reinforced at its free edge by a radially-extending stiffening flange to resist expansion of the flange adjacent said edge, the head being formed with an annular groove to permit limited expansion of the flange adjacent its opposite edge.

5. A cup-shaped brake drum having a braking flange and a head formed with inner and outer flat portions joined by an annular grooved portion having all of its surfaces curved to permit limited radial stretching in case of pressure directed outwardly on said flange.

6. A brake drum having a head and a substantially cylindrical braking flange reinforced at its free edge to resist expansion of the flange adjacent the edge, the head being radially resilient to permit limited radial deformation of the flange.

7. A brake drum having a head and a substantially cylindrical braking flange reinforced at its free edge to resist radial deformation at said free edge, the head being provided with an integral deformation to permit radial expansion thereof.

In testimony whereof, I have hereunto signed my name.

GERMAIN CALVIGNAC.